(12) United States Patent
Geus et al.

(10) Patent No.: US 6,919,296 B2
(45) Date of Patent: Jul. 19, 2005

(54) CATALYST FOR THE SELECTIVE OXIDATION OF SULFUR COMPOUNDS TO ELEMENTAL SULFUR

(75) Inventors: John Wilhelm Geus, Bilthoven (NL); Robert Johan Andreas Maria Terörde, Utrecht (NL)

(73) Assignee: Jacobs Nederland B.V., Leiden (NL)

( * ) Notice: Subject to any disclaimer, the term of this patent is extended or adjusted under 35 U.S.C. 154(b) by 229 days.

(21) Appl. No.: 09/764,001

(22) Filed: Jan. 17, 2001

(65) Prior Publication Data

US 2001/0008619 A1 Jul. 19, 2001

Related U.S. Application Data

(63) Continuation of application No. 09/142,309, filed on Dec. 7, 1998, now Pat. No. 6,207,127.

(30) Foreign Application Priority Data

Mar. 4, 1996 (NL) ............................................. 1002524
Mar. 4, 1997 (WO) .............................. PCT/NL97/00108

(51) Int. Cl.$^7$ ............................................. B01J 23/06
(52) U.S. Cl. ...................................................... 502/325
(58) Field of Search ................................. 502/300, 304, 502/325, 329, 349, 353, 514, 517, 500, 524

(56) References Cited

U.S. PATENT DOCUMENTS

| 4,311,683 A | 1/1982 | Hass et al. | ................... 423/573 |
| 4,474,739 A | 10/1984 | Zackey et al. | ............... 423/230 |
| 4,479,928 A | 10/1984 | Voirin | ..................... 423/574 R |
| 4,519,992 A | 5/1985 | Alkhazov et al. | ............ 423/230 |
| 4,818,740 A | 4/1989 | Berben et al. | ............... 502/313 |

(Continued)

FOREIGN PATENT DOCUMENTS

| EP | 0 001 551 A1 | 9/1978 |
| EP | 0 078 690 A2 | 11/1982 |
| EP | 0 091 551 A1 | 2/1983 |
| EP | 409353 A1 | 1/1991 |
| GB | 2 164 867 A | 6/1983 |
| JP | 56-10338 A | * 2/1981 ................. 502/524 |
| WO | WO 8404699 | 12/1984 |
| WO | WO-A 95/07856 | 3/1995 |

OTHER PUBLICATIONS

Chemical Abstracts, vol. 101, No. 8 Aug. 20, 1984, Alkhazov, et al. "Sulfur production from hydrogen sulfide–containing gases from petroleum Refineries using heterogeneous catalysts" p. 109.

Hurst et al. "Temperature Programmed Reduction" Catal. Rev.–Sci. Eng., 24 (2), 233–309–(1982).

Brunauer et al. "Absorption of Gases in Multimolecular Layers" (60) pp. 309–319, Feb. 1938 J.A.C.S.

Primary Examiner—Wayne A. Langel
(74) Attorney, Agent, or Firm—Weingarten, Schurgin, Gagnebin & Lebovici LLP

(57) ABSTRACT

The invention provides a catalyst, a method for making the catalyst and a method for using the catalyst to promote the selective oxidation of hydrogen sulfide into elemental sulfur. The catalyst may be prepared by contacting a catalyst support, such as silica, with a mixed oxide having atomically mixed iron ions and zinc ions, to produce a support material impregnated with a mixed oxide having atomically mixed iron ions and zinc ions in an oxidic lattice. This impregnated catalyst support is then dried and calcined, preferably with chloride ions present, to produce a catalyst of an iron and zinc oxide mixture supported on silica. It has been found that when chloride is added to the impregnated catalyst support prior to calcination and drying, the sintering of the iron and zinc can be controlled more easily and the formation of iron and zinc oxide is promoted. It has also been found that the catalyst of the invention exhibits improved selectivity characteristics when compared to a catalyst prepared without the chloride.

13 Claims, 4 Drawing Sheets

U.S. PATENT DOCUMENTS

| | | | |
|---|---|---|---|
| 4,916,105 A | * 4/1990 | Rieck et al. | 502/303 |
| 5,286,697 A | 2/1994 | Van den Brink et al. | 502/257 |
| 5,700,440 A | 12/1997 | Li et al. | 423/231 |
| 5,891,415 A | * 4/1999 | Alkhazov et al. | 423/573.1 |
| 5,965,100 A | * 10/1999 | Khanmamedov | 423/576.8 |
| 5,985,227 A | 11/1999 | Immel et al. | 423/242.1 |
| 6,087,294 A | * 7/2000 | Klabunde et al. | 502/224 |
| 6,218,335 B1 | * 4/2001 | Okada et al. | 502/340 |

* cited by examiner 5 wt. % iron oxide on silica
H₂S conversion ■ 3rd. □ 4th
Selectivity tv S. ● 3rd, ○ 4th Fe/Zn catalyst  a) Fe(5)Zn(10)Si-Cl.  (5 wt.% Fe ○ {10 wt. % ZnO on silicate, with CL)
b) Fe(5)Zn(10)Si.  (5 wt.% Fe ○ {10 wt. % ZnO on silicate, no CL)

Fe/Zn catalyst  a) Fe(5)Zn(10)Si-Cl.  (5 wt.% Fe ○ {10 wt. % ZnO on silicate, with CL)
b) Fe(5)Zn(10)Si.  (5 wt.% Fe ○ {10 wt. % ZnO on silicate, no CL)

CATALYST FOR THE SELECTIVE OXIDATION OF SULFUR COMPOUNDS TO ELEMENTAL SULFUR

CROSS REFERENCE TO RELATED APPLICATIONS

This application claims priority from U.S. application Ser. No. 09/142,309, filed Dec. 7, 1998 now U.S. Pat. No. 6,207,127, the entirety of which is herein incorporated by reference.

BACKGROUND OF THE INVENTION

The invention relates to a catalyst on support for the selective oxidation of hydrogen sulfide to elemental sulfur, to a method for the preparation of such a catalyst, and to a method for the selective oxidation of oxidizable sulfur compounds, such as hydrogen sulfide, mercaptans and thiophenes, to elemental sulfur.

The necessity that gases which are further processed in chemical processes, are supplied to buyers or are discharged to the atmosphere, be purified of sulfur compounds, in particular hydrogen sulfide, mercaptans and thiophenes, is generally known. There are many natural gas occurrences where the natural gas occurs together with hydrogen sulfide. Also, large amounts of hydrogen sulfide are released upon the hydrogenating desulfurization of petroleum fractions, which are optionally further concentrated via an absorption-desorption method.

One of the most well-known methods for converting hydrogen sulfide to harmless elemental sulfur is the so-called Claus process. In this process, first about one-third of the $H_2S$ is combusted, whereby $SO_2$ is formed. Owing to the combustion conditions, most organic contaminants in the gas stream are also combusted. The residual $H_2S$ reacts with the $SO_2$ formed, first thermally and then in the presence of a catalyst to form water and elemental sulfur, according to the following reaction:

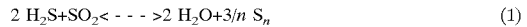

$$2\ H_2S + SO_2 \longleftrightarrow 2\ H_2O + 3/n\ S_n \qquad (1)$$

In practice, the catalytic reaction is carried out in a number of catalyst beds arranged one after the other. In spite of this, however, the $H_2S$ is not converted quantitatively to elemental sulfur, mainly as a consequence of the position of the thermodynamic equilibrium of the reaction.

A residual content of $H_2S$ and $SO_2$ remains. Now, generally it is not permitted to discharge $H_2S$-containing residual gas, so that it must be combusted, whereby the hydrogen sulfide and other sulfur compounds, as is the elemental sulfur present in the gas phase, are oxidized to sulfur dioxide. Owing to the large amounts of $H_2S$ that are processed, the amounts of $SO_2$ that are being emitted in this way are still considerable.

With environmental requirements becoming more stringent, this will no longer be allowed in view of the too high emission of sulfur dioxide involved. It is therefore necessary to further treat the residual gas from the Claus plant, the tail gas, in a tail gas plant.

It has been proposed to selectively oxidize the hydrogen sulfide that is present in the tail gas to elemental sulfur, optionally after hydrogenation of residual $SO_2$, to $H_2S$. For such selective oxidation processes specific catalysts are used.

U.S. Pat. No. 4,818,740, whose content is incorporated herein by reference, discloses such a catalyst, by the use of which side reactions are avoided to a large extent, while the main reaction occurs with a sufficient degree of conversion and selectivity.

The catalyst according to this patent contains a support of which the surface that can come into contact with the gas phase exhibits no alkaline properties under the reaction conditions, while on this surface a catalytically active material is provided. Further, the specific surface area of this catalyst is less than 20 m$^2$/g and less than 10% of the total pore volume in this catalyst has a pore radius between 5 and 500 Å.

An improvement of the method disclosed in the above-mentioned U.S. Pat. No. 4,818,740 is described in European patent publication 409,353, whose content is incorporated herein by reference. This patent publication relates to a catalyst for the selective oxidation of sulfur-containing compounds to elemental sulfur, comprising at least one catalytically active material and optionally a support, which catalyst has a specific surface area of more than 20 m$^2$/g and an average pore radius of at least 25 Å, while the catalyst exhibits substantially no activity for the reverse Claus reaction.

A third variant of such a catalyst is described in WO-A 95/07856. According to this patent publication the catalyst comprises at least one catalytically active material which has been applied to a support material, which support material, prior to the application of the catalytically active material, has been provided with at least one alkali metal promoter.

The effectiveness with regard to the conversion of $H_2S$ to elemental sulfur can generally be adversely affected by the occurrence of the following side reactions:

1. the subsequent oxidation of sulfur:

$$1/n\ S_n + O_2 \rightarrow SO_2 \qquad (2)$$

2. the reversed (or rather reversing) Claus equilibrium reaction:

$$3/n\ S_n + 2\ H_2O \longleftrightarrow 2\ H_2S + SO_2 \qquad (3)$$

Here the sulfur, once formed, enters into a reverse reaction with the water vapor also present, to form hydrogen sulfide and sulfur dioxide.

Tail gas generally contains, in addition to elemental sulfur, a considerable amount of water vapor, which amount can be between 10 and 40% by volume. This water vapor promotes the reversing Claus reaction to a great extent. Far-reaching removal of water vapor has evident technical disadvantages, such as the necessity for an additional cooling/heating stage, an additional sulfur recovery stage or a hydrogenation stage followed by a water-removing quench stage. A method whereby the conversion to elemental sulfur is hardly affected, if at all, by the water content of the feed gas is therefore desired.

Another important circumstance is that, generally, in the selective oxidation some excess of oxygen will be employed, not only to prevent "leakage" of $H_2S$, but also for control engineering reasons. It is precisely this excess of oxygen, however, which can give rise to the subsequent oxidation of the elemental sulfur formed, so that the effectiveness of the process is adversely affected.

Depending on the choice of the catalyst and the reaction conditions, it is possible with such catalysts to obtain conversions of sulfur compounds which are fed to the Claus process, of up to about 99.2% by weight.

A drawback of the above-described catalysts for the selective oxidation of sulfur compounds is that upon substantially complete conversion of the hydrogen sulfide, the oxidation to $SO_2$ of the sulfur formed increases with increasing temperature. An illustration thereof is given in the examples.

Technically, it is very difficult to accurately control the temperature at the end of the catalyst bed in the reactor. For processing large gas streams, as in the case of the tail gases from a Claus plant, in practice only adiabatic reactors are eligible. Since the selective oxidation reaction is exothermic, the inlet temperature and conversion determine the outlet temperature.

For achieving a sufficiently high conversion a minimum inlet temperature is required. On the other hand, it is endeavored to achieve as high a conversion as possible. With adiabatic reactors, this often results in a final temperature which is so high that in turn the selectivity decreases substantially, for instance to a value of about 80%. Clearly, there is a need for a catalyst which gives less rise to oxidation of sulfur to $SO_2$, more particularly at higher temperatures.

BRIEF SUMMARY OF THE INVENTION

In the two first-mentioned patent publications, mention was made of the pore structure of the catalyst (support) playing an important role. While in the third variant the nature of the support had an influence, it has now been found that through a specific choice of a catalytic material the course of the selectivity with the temperature can be improved, that is, that the decrease of the selectivity occurs only at higher temperatures.

It has been found that through the use of a catalytically active material consisting of a mixed oxide, whereby at least two metals in the form of ions are included in the oxidic lattice and are mixed with each other on an atomic scale, a considerably improved selectivity is obtained. One of the metals should be capable of easily changing its valence, while at least one of the other metals cannot, or only difficultly, change its valence, all under the conditions of selective oxidation (temperatures of 180 to 350° C.; $p_{O2}$ 0.01 to 0.5 bar). The basis for this effect is not clear. It can be supposed that through the presence of the second metal the oxygen that is needed for the oxidation of sulfur to $SO_2$ becomes available insufficiently.

DETAILED DESCRIPTION OF THE INVENTION

Figure 1:
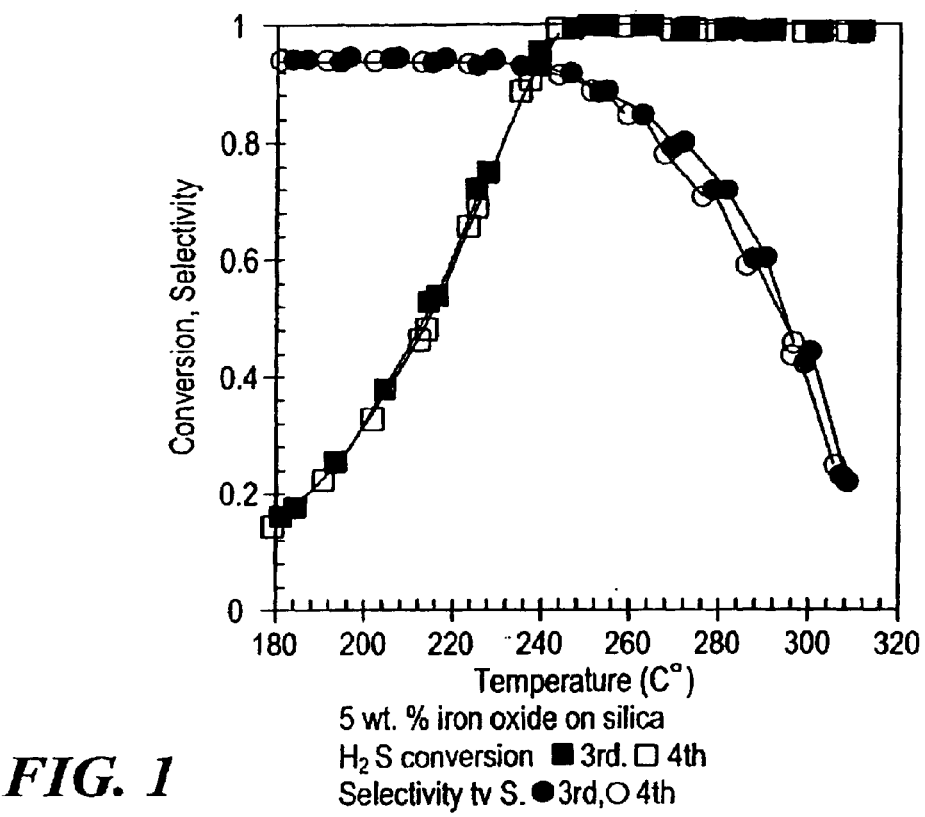
FIG. 1 plots the conversion rate of hydrogen sulfide ($H_2S$) to sulfur (S) and the selectivity of an iron oxide catalyst for that oxidation reaction, as a function of catalyst bed temperature.

The invention accordingly relates primarily to a catalyst for the selective oxidation of sulfur-containing compounds to elemental sulfur, comprising at least one catalytically active material that is present on a support material, the catalytically active material consisting at least partly of a mixed oxide with an oxidic lattice, in which at least two metals in the form of ions are included.

For determining the presence of such a mixed oxide, which preferably accounts for at least 75% of the catalytically active material, and in which the metals are mixed on an atomic scale, use can be made of 'extended X-ray absorption edge fine structure' (EXAFS). This is a technique by which the atomic ringing of atoms can be determined without an ordered structure being necessary, though it must first be established that the metal ions are uniformly present in the catalytically active material. This can be done, for instance, with the aid of a combination of X-ray diffraction and temperature-programmed reduction. The X-ray diffraction pattern may not exhibit any sharp diffraction maxima, while the TPR profile may not show any separate peaks for the individual metal oxides.

A particularly suitable method for determining atomic mixing is the Mössbauer spectroscopy, which is possible, for instance, with iron and tin.

As first metal, i.e. the metal that can readily change its valence, it is preferred to use iron and/or chromium, more particularly iron. The second metal, i.e. the metal for which it is impossible or difficult to change its valence, it is preferred to use tin, zinc, cerium, antimony and/or germanium. Of these metals, zinc is preferred.

The mutual ratio of these metals is preferably between 25/75 and 97.5/2.5, more particularly 95/5 to 50/50, on an atomic basis.

According to a preferred embodiment, the catalyst according to the invention has a specific surface area of more than 20 m$^2$/g and an average pore radius of at least 25 Å, while the catalyst exhibits substantially no activity for the reversing Claus reaction under the reaction conditions.

It is noted that in the present invention the absence of Claus activity is defined as the absence of any influence of water on the selectivity of the oxidation reaction of $H_2S$ to sulfur in the presence of at least a stoichiometric amount of $O_2$ at 250° C. More particularly, this means that in the presence of 30% by volume of water the selectivity of the reaction to elemental sulfur may not be lower by more than 15% than the selectivity in the absence of water. This definition of the Claus reaction is based on the equilibrium reversing Claus reaction

$$3/n\ S_n + 2\ H_2O \leftrightarrow 2\ H_2S + SO_2 \qquad (3)$$

If a material is Claus-active, the presence of water has as a consequence that the reaction proceeds in the direction of $H_2S$ and $SO_2$, so that a part of the sulfur is converted back to $H_2S$ and $SO_2$ again. $H_2S$ is thereafter oxidized with the $O_2$ present, to sulfur and water vapor, whereafter the Claus-active catalyst converts the sulfur to $SO_2$ again. Through this concurrence of reactions, a catalyst with Claus-active sites will in the presence of water give rise to a substantial decrease of the selectivity.

Within the framework of the invention, specific surface area is understood to be the BET surface area as defined by S. Brunauer et al, in J.A.C.S. 60, 309 (1938). Employed was a nitrogen adsorption at 77 K according to the so-called three-point measurement. For the purpose of the calculation, the surface area of a nitrogen molecule was assumed to be 16.2 Å$^2$.

The average pore radius is determined starting from a cylindrical pore model, using the following formula:

$$\text{Average pore radius (Å)} = \frac{20{,}000 \times \text{pore volume (cm}^3/\text{g)}}{BET \text{ surface area (m}^2/\text{g)}}$$

The pore volume used herein is determined gravimetrically through impregnation with water under vacuum. The specific pore volume can also be determined using mercury porosimetry up to a pressure of 2,000 bar. The values obtained with the two methods match well.

The specific surface area of the catalyst according to the invention can correspond to both the values according to U.S. Pat. No. 4,818,740 and to the values according to European patent publication 409,353. More particularly, the specific surface area is at least 20 m²/g, preferably more than 25 m²/g, since at such values a good activity can be obtained, Preferably, the specific surface area of the catalyst will not be greater than 300 m²/g catalyst. At higher values, generally no specific additional advantages are to be gained.

The requirement regarding the average pore radius is of importance in connection with the nature of the reaction. If there are too many small pores, this entails the risk that, owing to an unduly long residence time of sulfur in the pores, a subsequent oxidation of sulfur to $SO_2$ occurs, which is undesired. Preferably, the average pore radius is generally at least 100 Å, while an upper limit is formed by 2,000 Å. Above this limit, in general no additional advantage is to be gained, while on the other hand problems may arise in the preparation of the support. More particularly, an average pore radius not greater than 500 Å is preferred.

The catalyst according to the invention can, if desired, be promoted with one or more promoters. It is possible, for instance, to promote the support with an alkali metal, as described in WO-A 95/07856. The nature and the amount of the alkali metal promoter can vary. As regards the nature, it can be noted that it can be based on the conventional alkali metals, more particularly lithium, potassium and sodium, the latter being preferred most.

The catalyst according to the invention can also contain one or more other promoting materials. Suitable promoting materials according to the invention are phosphorus compounds. These can, for instance, be applied to the catalyst through impregnation with a soluble phosphorus compound.

The catalyst according to the invention generally contains 0.1–50% by weight, based on the total mass of the catalyst, of a material that is catalytically active for the selective oxidation of $H_2S$ to elemental sulfur.

It should be stressed that this concerns the active material that is accessible to the reaction gases. After all, through sintering or through a deviant method of preparation, it is also possible for a part of the active material, in particular metal oxide, to be encapsulated, for instance by narrow pores in the support being sintered up. However, the difference between encapsulated metal oxide and metal oxide present on the support can be easily determined with TPR, temperature-programmed reduction. Details of this measuring technique are described in N. W. Hurst, S. J. Gentry, A. Jones and B. D. McNicol, Catal. Rev. Sci. Eng. 24 (2), 233–309 (1982). The amount of metal oxide present that is accessible to gases can thus be determined.

The catalyst consists of a support material on which a catalytically active material has been provided. The active component is preferably present on the support in a content by weight of between 0.1 and 40%, preferably 0.1–10% by weight, based on the total weight of the catalyst.

In general, as support, a ceramic material is used which exhibits no Claus activity under the reaction conditions, or has been inactivated for this activity. Suitable materials are inter alia silicon oxide, aluminum oxide, or sintered metals.

Silicon dioxide, when used as support, has been found to give good results, and the use thereof is therefore preferred.

In principle, the catalysts according to the invention can be prepared using known methods for the preparation of supported catalysts.

In the preparation of the catalyst it is essential that the active component is applied to the support material in the form of a mixed oxide. It has been found that the conventional methods, wherein prior to calcination the acid residues, such as chlorides, are removed as far as possible by washing with water, do not lead to the formation of mixed oxides with atomic mixing. The known method, such as described, for instance, in GB-A 2,164,867, comprises dissolving various metal chlorides in water, precipitating the metals, washing the precipitates until no Cl⁻ can be demonstrated in the washing water anymore, followed by the formation of the catalyst and the calcining thereof.

With such a method a mixture of oxides is obtained. The removal of the chlorides was deemed necessary because the chlorides of the present metals are volatile. During calcination, a transport of the metals over the surface then occurs, which leads to a reduction of the active surface (sintering). In practice, this means that the activity decreases to so great an extent that the catalyst is not usable anymore.

Surprisingly, it has now been found that through the application of a controlled amount of chloride, for instance in the form of $NH_4Cl$, the sintering of the metals can be eminently controlled and at the same time the formation of a mixed oxide is promoted. The amount of chloride preferably used is between 0.1 and 20% by weight, based on the amount of metal ions. In other words, a weight ratio of metal ions to chloride between 4:1 and about 1000:1 is used.

In order to properly control the amount of chloride, it is preferred to apply the metals in the form of other salts than the chlorides. Most suitably, use can be made of ammonium-metal-salts such as -citrates. In the case of iron and zinc, ammonium-iron-citrate and ammonium-zinc-citrate are used. Upon co-impregnation with the aid of aqueous solutions of these two compounds, to which a slight amount of $NH_4Cl$ had been added, after calcining a mixed oxide as herein defined was obtained. Without addition of chloride a mixture of oxides was obtained, as will also appear from the examples.

In order to bring the catalyst support into a suitable form, it can, if necessary, be subjected beforehand to a sintering treatment, prior to the application and/or after it. A sintering treatment can also be optionally carried out with a ready catalyst, so that micropores are sintered up.

The invention also relates to a method for the selective oxidation of sulfur-containing compounds, in particular hydrogen sulfide, to elemental sulfur, using the catalyst according to the invention.

According to this method hydrogen sulfide is oxidized directly to elemental sulfur by passing a hydrogen sulfide-containing gas together with an oxygen-containing gas over the catalyst at elevated temperature.

It should be noted that the achievement of optimum results is determined not only by the nature of the catalyst but also by the process variables. In this connection, in particular the selected temperature and the contact time are of importance for the oxidation. For that matter, by the use of the present catalyst it is possible to tolerate an excess of oxygen and/or the presence of water in the gas to be treated.

The oxidation process is carried out by adding to the hydrogen sulfide-containing gas, while using a ratio regulator known per se, oxygen or an oxygen-containing gas in such an amount that the molar ratio of oxygen to hydrogen sulfide is between 0.5 and 25.0 and preferably between 0.5 and 1.5.

The method according to the invention can be used for the selective oxidation of all gases which contain sulfur-containing compounds, in particular hydrogen sulfide. Examples of processes where the oxidation according to the invention can be suitably used are the processes as described in European patent application 91551, European patent application 78690 and in U.S. Pat. No. 4,311,683.

The method according to the invention is pre-eminently suitable to oxidize gas that does not contain more than 2.5% $H_2S$, because then a normal, adiabatically operating reactor can be used.

In the oxidation the inlet temperature of the catalyst bed is selected to be above 150° C. and preferably above 170° C. This temperature is partly determined by the requirement that the temperature of the catalyst bed must be above the dew point temperature of the sulfur formed.

Using measures known per se, the maximum temperature in the catalyst bed is generally maintained below 330° C. and preferably below 300° C.

When the $H_2S$ content is higher than 2.5% by volume, it may be necessary to take measures in order to prevent the temperature in the oxidation reactor becoming too high as a result of the reaction heat released. Such measures include, for instance, the use of cooled reactor, for instance a tubular reactor, where the catalyst is disposed in a tube surrounded by a cooling agent. Another method is to recirculate the gas stream with a low conversion per passage through the reactor and to cool the gas stream after the reactor.

The method according to the invention can be applied with particular advantage for the selective oxidation of the hydrogen sulfide-containing tail gases coming from a Claus plant. Apart from the very high selectivity of the catalyst according to the invention, a very important advantage is thereby obtained in that the removal of water prior to the oxidation is not necessary anymore. When, using the method according to the invention, the tail gases referred to are oxidized, these can preferably be first passed through a hydrogenation reactor, in which, for instance, a cobalt-molybdenum containing catalyst is present and in which all sulfur constituents are hydrogenated to hydrogen sulfide.

The method according to the invention is further particularly suitable for desulfurizing, for instance, heating gases, refinery gases, biogas, coke oven gas, vent gases from chemical plants such as viscose factories, or gases which are burnt off on gas and/or oil extraction sites.

The invention is explained in and by the following examples.

Preparation of the Catalysts

Used as support in the preparation of the catalysts were cylindrical silicon dioxide extrusions of a diameter of 2.1 mm and a length of about 10 mm. The silicon dioxide had a specific surface area of 45 $m^2$ per g, a pore volume of 1.1 ml/g and an average pore diameter of 70 mm. The active component(s) was or were applied by pore volume impregnation. The iron-containing precursor was ammonium iron citrate, while the zinc was also impregnated as a citrate solution. If necessary, sal ammoniac (ammonium chloride) was added to the impregnated solution in varying amounts. It is of importance to note that after calcination of the catalyst no chloride could be demonstrated in the material anymore. After impregnation, the support material was dried and then calcined at 500° C. During calcination it was ensured that the temperature did not run up too high as a result of the oxidation of the citrate. This was done by adjusting the air stream over the catalyst.

Catalytic Experiments

A gas stream consisting of 1% $H_2S$, 5% $O_2$, 30% water and nitrogen was passed through the catalyst bed at a space velocity of 12,000 $h^{-1}$. From the analysis of the gas stream before and after the reactor the conversion and the selectivity were calculated. With the measurements described here, the catalyst bed had been chosen to be so small that the temperature within the bed was practically uniform.

FIG. 1 gives the conversion of the hydrogen sulfide and the selectivity of an iron oxide catalyst according to the state of the art. The conversion and the selectivity are plotted as a function of the temperature of the catalyst bed. The measurements commenced at a temperature of 180° C., where the conversion and the selectivity were determined. After the catalyst bed had stabilized, which was evident from the fact that the conversion and the selectivity did not change anymore, the temperature was raised by about 10° C., whereafter the measurement was repeated in the same manner. When the temperature had reached 320° C., the temperature was successively reduced by about 10° C. in the same manner. The thus obtained results are plotted in FIG. 1; the open squares indicate the conversion measured during the third-time increase of the temperature and the open circles indicate the associated selectivity. The closed squares and circles give the results measured during the fourth-time heating of the catalyst bed.

From the results of FIG. 1 it clearly appears that the selectivity of the catalytic reaction decreases markedly at temperatures above about 240° C. For the technical implementation of the selective oxidation this is highly disadvantageous. As has been set out hereinabove, it is technically impossible to set the final temperature of the catalyst bed at about 240° C. A higher final temperature, which is mostly unavoidable, then leads to a considerably lower selectivity. The fact that the curves measured during the third- and fourth-time heat-up of the catalyst bed coincide, shows that the catalyst is completely stable.

Figure 2A:
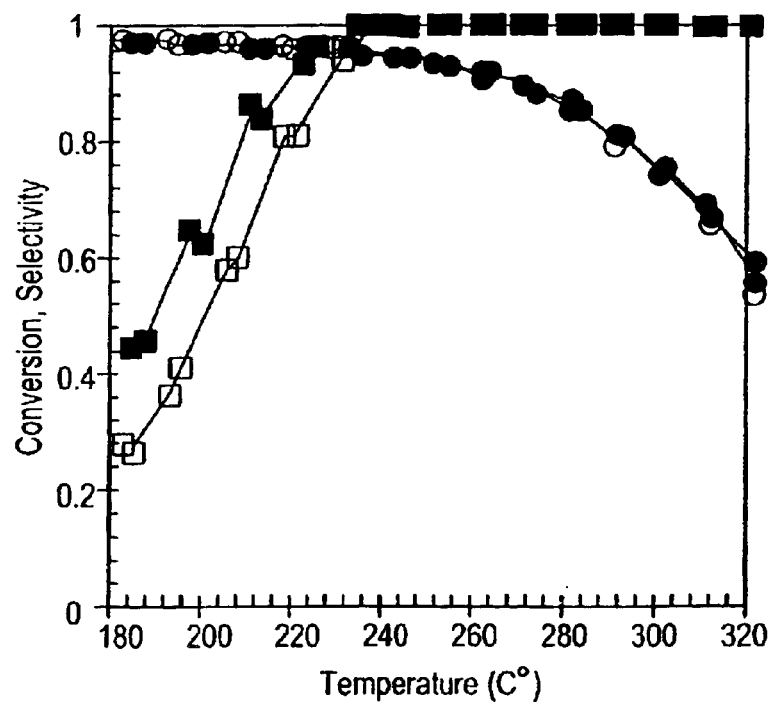
FIGS. 2A and 2B plot, as a function of catalyst bed temperature, the conversion rate of hydrogen sulfide ($H_2S$) to sulfur (S) and the selectivity for that reaction of two iron-zinc oxide catalysts (5 wt. % iron oxide; 10 wt. % zinc oxide), the FIG. 2A catalyst having the iron and zinc ions mixed on an atomic scale, and the FIG. 2B catalyst having.
Figure 2B:
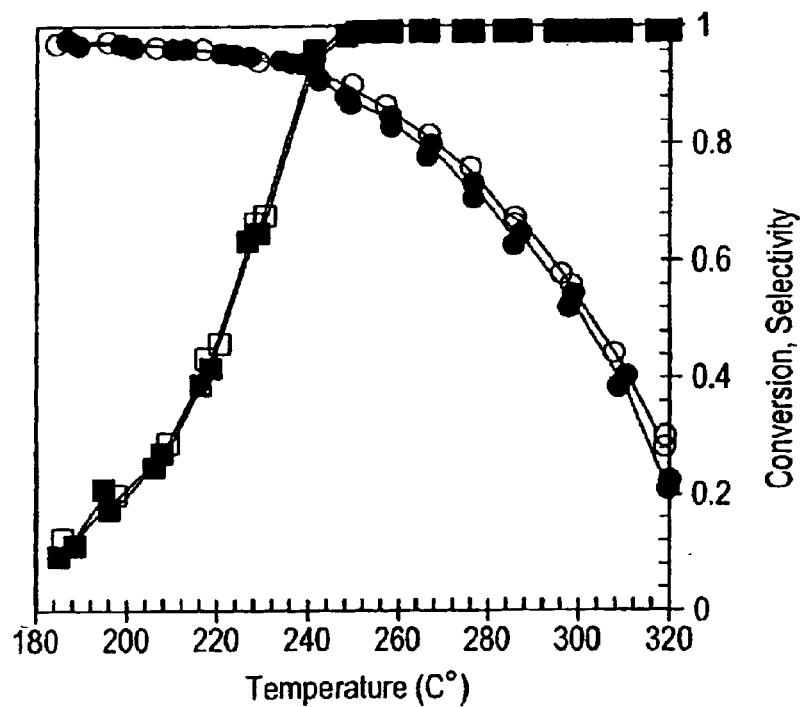

In FIGS. 2A–2B the conversion and the selectivity of iron-zinc oxide catalysts, measured in the same manner, are plotted as a function of the temperature. The loading of the silicon dioxide support is in both cases 5% by weight of iron oxide and 10% by weight of zinc oxide. In the case of the catalyst whose data are shown in FIG. 2A, 2% by weight of chloride has been impregnated on the support in accordance with the invention. In FIG. 2A, the results measured on a catalyst according to the present invention are shown; in FIG. 2B, those for an iron-zinc oxide catalyst in which the iron and zinc ions are not mixed on an atomic scale. If the right-hand graph of FIG. 2B (an iron-zinc oxide catalyst) is compared with that of FIG. 1 (an iron oxide catalyst), it is found that the presence of the zinc oxide in the catalyst improves the selectivity at higher temperature only to a slight extent. Although the chemical composition of the two catalysts whose results are plotted in FIGS. 2A and 2B is not different, it is clear that the selectivity of the catalyst whose results are shown in FIG. 2B, decreases appreciably less fast with temperatures above 240° C. than does the selectivity of the FIG. 2B catalyst. While in the case of the FIG. 2A catalyst the selectivity at 320° C. is still 60%, the selectivity of the catalyst to which no chloride has been added in the preparation is only about 20% at the same temperature. A catalyst whose selectivity decreases less fast with increasing temperature makes it possible to greatly reduce the emission of sulfur compounds from Claus plants.

Figure 3:
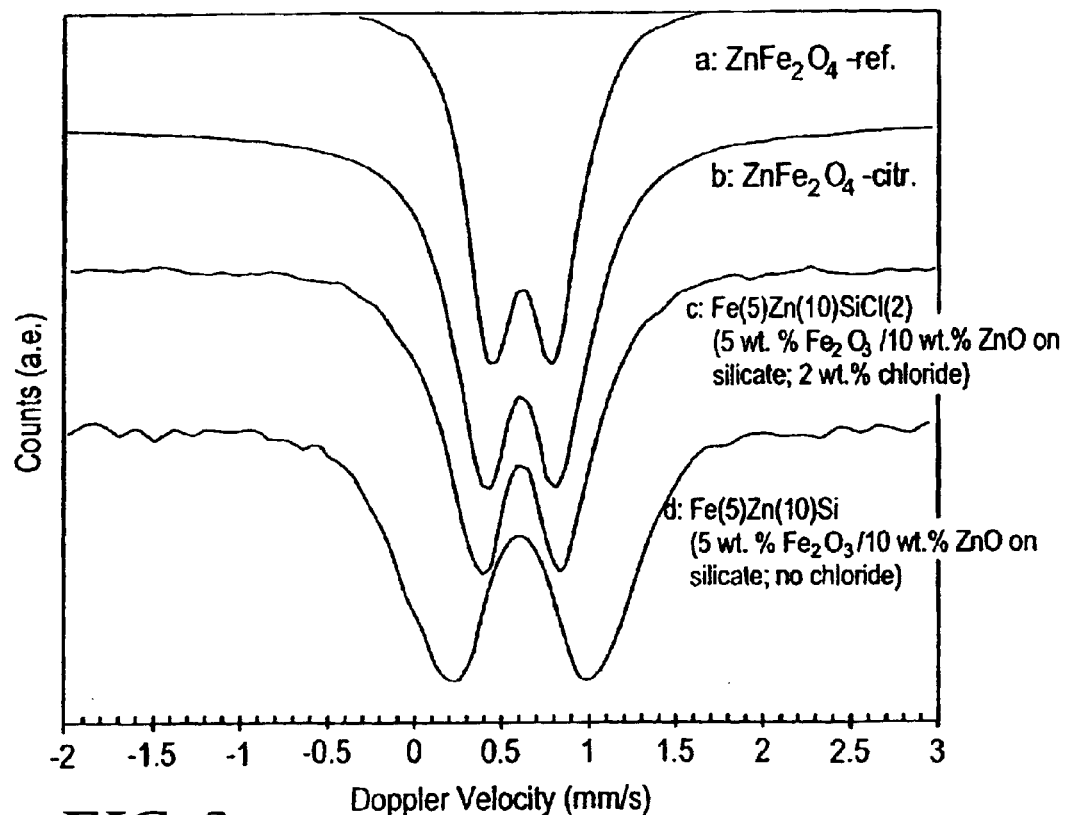
FIG. 3 shows the Mössbauer spectra of the following: (a) bulk $ZnFe_2O_4$ as a reference; (b) an iron and zinc citrate solution calcined after drying; (c) a Fe(5) Zn(10)SiCl(2); with 2 wt. % chloride ions; and (d) an iron-zinc oxide catalyst initially lacking chloride ions.

It is of importance to demonstrate the atomic mixing of iron and zinc ions in an oxide lattice. In the case of iron compounds this can be eminently done with Mössbauer spectroscopy. In FIG. 3 Mössbauer spectra of "bulk" zinc ferrite, $ZnFe_2O_4$, (spectrum "a") are included. Also included is a Mössbauer spectrum of a solution of iron and zinc citrate which has been calcined after drying (spectrum "b"). In both cases a characteristic spectrum d of zinc ferrite is obtained. The lower spectrum of FIG. 3 has been measured on an iron-zinc oxide catalyst in which initially no chloride ions were present. It is clear that this spectrum differs greatly from the spectrum of zinc ferrite. If, by contrast, initially 2% by weight of chloride was present in the catalyst, this resulted, after calcination, in the catalyst whose Mössbauer spectrum is included under (c) in FIG. 3. It is clear that the last spectrum is identical to that of zinc ferrite. Since iron oxide or zinc ferrite provided on a support in finely divided form exhibit no clear X-ray diffraction pattern, this conclusion cannot be reached with X-ray diffraction.

From the results of the left-hand graph in FIG. 2A it is clear that the conversion upon third-time heat-up of the catalyst is higher than upon fourth-time heat-up. This indicates that the catalyst is losing activity. The following experiments were carried out to determine the cause of this deactivation.

Figure 4A:
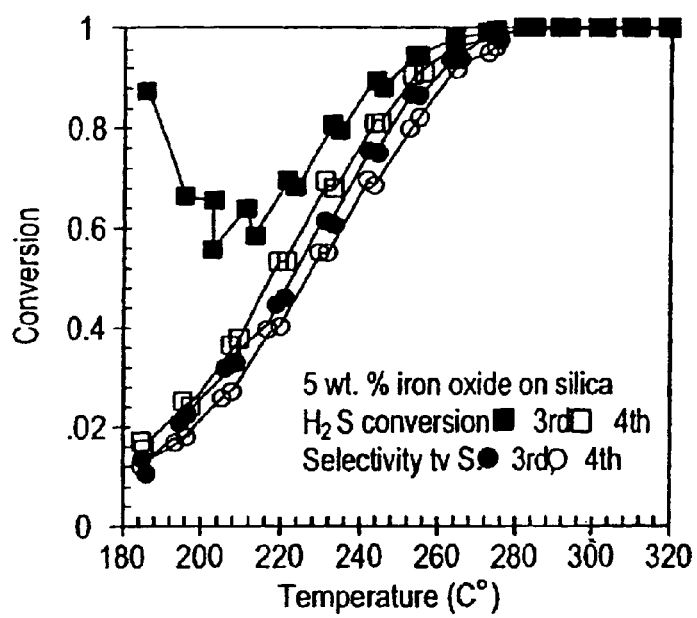
FIGS. 4A and 4B show the $H_2S$-to-S conversion rate and selectivity of a catalyst in which 5% iron oxide by weight is applied to silicon oxide, with (FIG. 4A) and without (FIG. 4B) the addition of 2% chloride ions by weight.
Figure 4B:
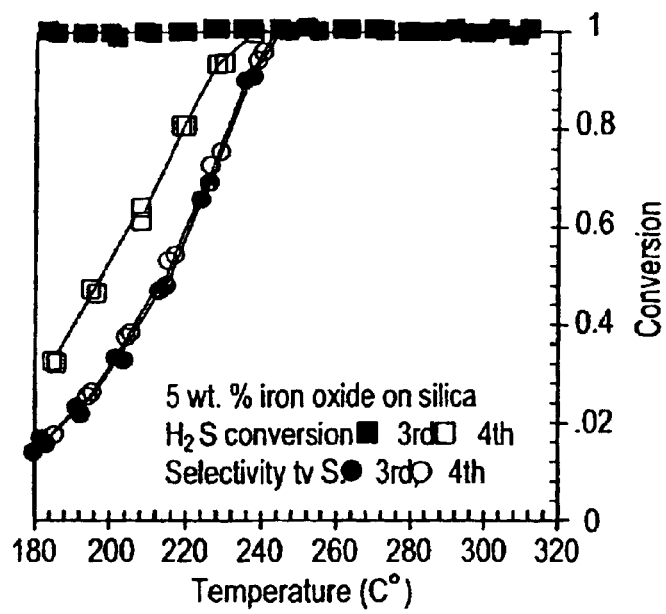

In FIGS. 4A and 4B, representing results measured on a catalyst in which 5% by weight of iron oxide had been applied to silicon oxide, it is determined what the influence is of the addition of chloride ions to the catalyst before drying and calcination. Depicted on the left FIG. 4A, are the results for a catalyst to which prior to drying and calcination 2% by weight of chloride ions had been added, and in FIG. 4B, the result for a catalyst in which initially no chloride ions were present. The experimental results are represented as measured during first-time (filled squares), second-time (open squares), third-time (filled circles) and fourth-time (open circles) heat-up. It is clear that the catalyst to which chloride ions had been added is much less active. During the fourth-time heat-up, the catalyst in which initially no chloride ions are present achieves a conversion of 100% at a temperature of about 240° C., while the catalyst which initially contained chloride ions showed a 100% conversion only at a temperature of about 280° C. The activity during the first-time heat-up too is considerably higher for the catalyst which initially contains no chloride. It is of importance to note here too that the chemical composition of the two catalysts after calcination is identical. During calcination, iron chloride is formed, which is volatile. Through transport of the iron chloride larger iron oxide particles are formed, so that the active surface area is reduced. The presence of larger iron oxide particles in the calcined catalyst appears from the fact that the X-ray diffraction pattern of the calcined catalyst clearly shows the maxima of $\gamma$-$Fe_2O_3$ (maghemite), while that of the catalyst which initially contains no chloride does not show any clearly identifiable diffraction maxima.

Although the chloride is necessary to effect the atomic mixing of iron and zinc ions in an oxide lattice, the minimal amount should be provided in the catalyst so as to reduce the activity of the catalyst as little as possible. In order to provide the optimum amounts of chloride in the catalyst before calcination and to determine the optimum iron/zinc ratio, the temperature at which the maximum yield of sulfur is measured was used as a measure of the activity and the selectivity at higher temperatures. An optimum catalyst exhibits the maximum conversion of hydrogen sulfide to elemental sulfur at a lowest possible temperature.

Figure 5:
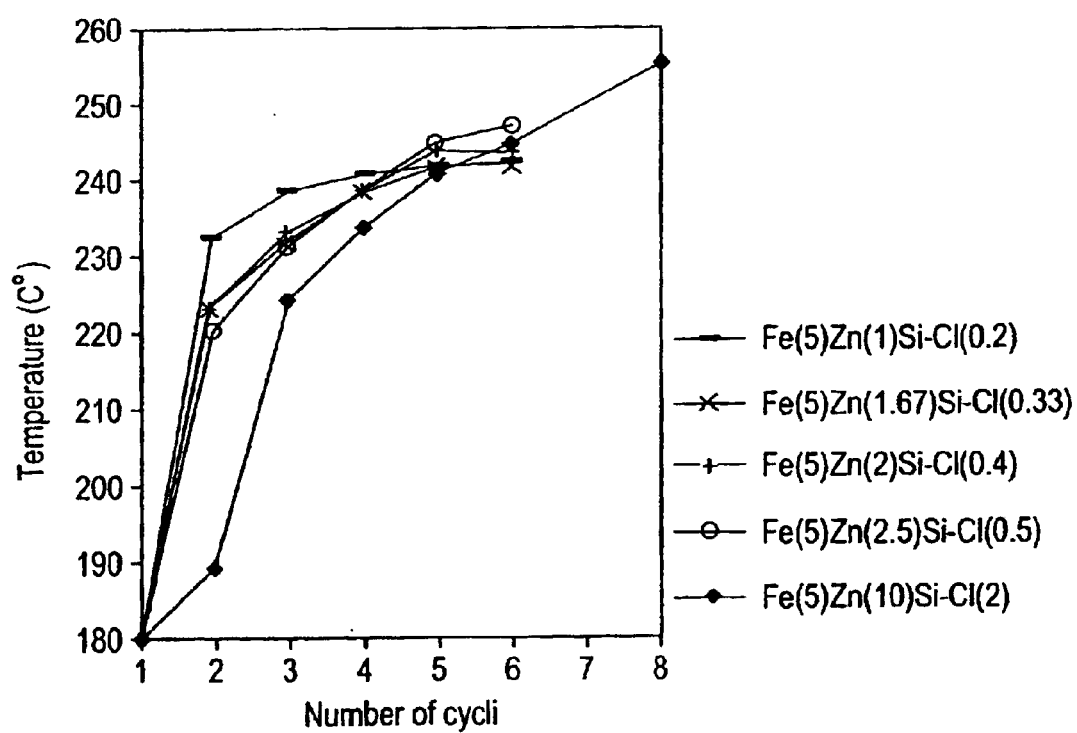
FIG. 5 shows, for different catalysts, the lowest possible temperature for maximum $H_2S$-to-S conversion, as a function of the number of times the catalyst has been heated to 320° C.

In FIG. 5 the above temperature is plotted as a function of the number of times that the catalyst has been heated to 320° C. for a number of catalysts with a different composition before calcination. The iron/zinc ratio and the chloride content are indicated on the right-hand side of the figure. Deactivation of the catalyst appears from the increase of the temperature at which the maximum sulfur yield is obtained. From the results of this figure it appears that the catalyst with 5% by weight of iron, 1% by weight of Zn and initially 0.2% by weight of chloride yields the best results. Upon fourth-time heat-up the temperature of the maximum sulfur yield does not rise appreciably anymore, remaining substantially constant at 240° C.

What is claimed is:

1. A catalyst on a support for the selective oxidation of sulfur-containing compounds to elemental sulfur, comprising at least one catalytically active material that is present on a support material, wherein the catalytically active material comprises a mixed oxide having atomically mixed iron ions and zinc ions in an oxidic lattice, which catalyst has a specific surface area of more than 20 $m^2/g$ and exhibits substantially no Claus activity under the reaction conditions of said selective oxidation.

2. A catalyst according to claim 1, wherein the atomic ratio of iron to zinc is between 25/75 and 97.5/25.

3. A catalyst according to claim 1, wherein the atomic ratio of iron to zinc is between 95/5 and 50/50.

4. A catalyst according to claim 1, which catalyst has a specific surface area of more than 25 $m^2/g$, and an average pore radius within a range of about 100 Å to 500 Å.

5. A catalyst according to claim 1 or claim 4, wherein the support is $SiO_2$.

6. A catalyst according to claim 1 or claim 4, wherein the catalytically active material is present on the support in an amount of 0.1–50% by weight, calculated on the total mass of the catalyst.

7. A catalyst according to claim 1, wherein said catalyst has a specific surface area of more than 20 and up to 300 $m^2/g$.

8. A catalyst according to claim 1, wherein said catalyst has a specific surface area of more than 20 and up to 300 $m^2/g$ and an average pore radius within a range of 100 to 500 Å.

9. A method for the preparation of a catalyst according to claim 1, comprising atomically mixing iron and zinc compounds for an oxide lattice, applying the atomically mixed iron and zinc compounds to the surface of a support material, followed by drying and calcination of the support material, during which calcination, an amount of chloride is present on the support material, wherein the prepared catalyst has a specific surface area of more than 20 $m^2/g$ and exhibits substantially no Claus activity under reaction conditions for the selective oxidation of sulfur-containing compounds to elemental sulfur.

10. A method according to claim 9, wherein the applying step comprises impregnating the support material with said atomically mixed iron and zinc compounds in solution, and further comprising, during or after the impregnation, applying an amount of chloride to the surface of the support material.

11. A method according to claim 9 or 10, wherein the amount of chloride is between 0.1 and 20% by weight, based on the amount by weight of the metals.

12. A method according to claim 9 or 10, wherein the chloride is ammonium chloride.

13. A method according to claim 11, wherein the chloride is ammonium chloride.

* * * * *

UNITED STATES PATENT AND TRADEMARK OFFICE
CERTIFICATE OF CORRECTION

PATENT NO. : 6,919,296 B2
APPLICATION NO. : 09/764001
DATED : July 19, 2005
INVENTOR(S) : John Wilhelm Geus et al.

It is certified that error appears in the above-identified patent and that said Letters Patent is hereby corrected as shown below:

Column 9, line 30, "and in FIG." should read --and on the right in FIG.--; and

Column 10, claim 2, line 23, "97.5/25." should read --97.5/2.5.--.

Signed and Sealed this

Twenty-third Day of December, 2008

JON W. DUDAS
*Director of the United States Patent and Trademark Office*